UNITED STATES PATENT OFFICE 2,116,341

ADHESIVE COMPOSITION AND A COVERING STRUCTURE HAVING AN ADHESIVE COATING

William B. Coleman, Bloomfield, N. J., assignor to Congoleum-Nairn Inc., a corporation of New York No Drawing. Application November 16, 1935, Serial No. 50,158

5 Claims. (Cl. 134—23.91)

The present invention relates to adhesives and more particularly to adhesives especially adapted for the installation of linoleum or similar surface coverings on floors, walls and the like.

The new and improved adhesive developed in accordance with the present invention comprises as a binder ingredient the residue obtained after distillation of the alcohol from fermented cane sugar molasses and commonly designated in the trade as concentrated molasses residue, and as a filler ingredient a plastic or semi-plastic clay. Preferably the concentrated molasses residue constitutes the whole or a major proportion of the binder ingredient of the improved adhesive composition, although if desired other binder ingredients such as concentrated sulphite liquor may be employed in conjunction therewith.

Concentrated molasses residue is a complex mixture of vegetable gums, unfermentable sugars, inorganic salts, and water, somewhat variable in composition but usually containing 60%–80% solids and 20%–40% water. It results as a by-product from the well known treatment of so-called "black strap" molasses whereby the molasses is diluted with water, allowed to ferment, and the alcohol removed by distillation. The residue from this distillation, known as dilute molasses residue is then evaporated to the consistency of a heavy syrup yielding what is known as concentrated molasses residue. This material is dark in color and normally has a specific gravity of 36° to 38° Bé. or approximately 1.33 at 60° F./60 F.

In preparing the novel adhesive of the present invention, plastic or semi-plastic clay, as for example ball clay, is admixed with the concentrated molasses residue obtained as above described. Depending upon the specific purpose for which the adhesive is to be used, water, in addition to that normally present in the binder and clay, may be added. In general it has been found that the most satisfactory adhesive for the installation of linoleum or similar surface covering, is obtained when the concentrated molasses residue and plastic or semi-plastic clay are combined in the proportions of 5 to 8 parts of clay (dry basis) to 6 parts concentrated molasses residue (solids basis). Normally it will be found unnecessary to add additional water above that present in the concentrated molasses residue. Where the adhesive is to be spread by trowel the desirable water content of the adhesive has been found to be 20% to 25% based upon the total weight of the adhesive. However, in adhesives for brush spreading the proportion of water will be somewhat greater and may run as high as 35%. If desired, a preservative such as carbolic acid, copper sulphate or equivalent, and a scenting agent such as oil of sassafras to provide a pleasant odor, may be added.

Typical formulas for the improved adhesive of the present invention are as follows:—

*For trowel spreading*

| | Parts |
|---|---|
| Concentrated molasses residue (37% water) | 100 |
| Plastic or semi-plastic clay | 60 | or reduced to a percentage basis—

| | Percent |
|---|---|
| Concentrated molasses residue (solids) | 39 |
| Plastic or semi-plastic clay (dry) | 38 |
| Water | 23 |

*For brush spreading*

| | Parts |
|---|---|
| Concentrated molasses residue (37% water) | 100 |
| Plastic or semi-plastic clay | 50 |
| Additional water | 17 | or reduced to a percentage basis—

| | Percent |
|---|---|
| Concentrated molasses residue (solids) | 38 |
| Plastic or semi-plastic clay (dry) | 30 |
| Total water | 32 |

In either of the above formulas 1/20 part of oil of sassafras may be added to provide a pleasant odor and 1/20 part of carbolic acid or equivalent may be added as a preservative. Also, as above mentioned, the composition may be modified by substitution of lignin, i. e., concentrated sulphite liquor from the wood pulp industry, for a proportion of the concentrated molasses residue binder, these materials mixing in all proportions to yield adhesive products having physical properties intermediate those of compositions utilizing wholly a concentrated sulphite liquor binder and those of the improved adhesive of the present invention. It is to be preferred, however, to employ the concentrated molasses residue as the sole binder.

The improved adhesive of the present invention has unusually high bonding power and high initial tackiness. When spread it resists "skinning" thereby providing ample time for application, without haste, of the surface covering to be installed. It remains slightly plastic and flexible after becoming fully set. It is substantially lower in cost than adhesives heretofore known and commonly used for the installation of floor and wall coverings. Furthermore, for a given viscosity the improved adhesive contains substantially less water than adhesives heretofore known and used for similar purposes. This is an extremely important advantage in the installation of linoleum over wood sub-floors where the presence of an excessive amount of water often causes warping of the sub-floor and failure of the installation.

The improved adhesive above described may also be used with marked advantages in the manufacture of surface coverings of the type described and claimed in United States Patent 1,970,503 wherein the cementitious material for bonding the surface covering to the sub-surface is applied to the reverse side of the covering in the course of its manufacture and caused to set, thus forming a normally non-tacky layer adapted to be activated when the covering is installed. When so employed the characteristic and substantial flexibility and plasticity of the hardened, normally non-tacky layer of the improved adhesive of this invention increases the flexibility of such surface covering structure thereby facilitating handling and installation.

For the installation of wall coverings the improved adhesive may be applied by troweling or brushing. In such installations, particularly those made over plaster walls, the present adhesive offers two important advantages. First, there is but slight shrinkage of the adhesive film upon drying, and, secondly, after drying the adhesive remains permanently somewhat plastic and flexible and thus capable of absorbing the normal expansion and contraction of the plaster or other subwall caused by the absorption or loss of moisture, without breaking the bond between the surface covering and the subwall.

Regardless of whether the adhesive be prepared and used in the form of a spreadable product or in the form of a hardened, normally non-tacky layer adapted to be activated, the essence of the invention is the novel composition which comprises concentrated molasses residue and a plastic or semi-plastic clayey material.

I claim:

1. An adhesive material adapted to be applied as the bonding material for bonding a covering structure of the character herein described to the surface of floors, walls or the like, said adhesive material consisting substantially entirely of a mixture of an organic binder and plastic or semi-plastic clayey material and sufficient water to render the mixture spreadable, said binder comprising concentrated molasses residue resulting from distillation of fermented molasses in such proportion that in said mixture there are about 5 to 8 parts of said clayey material (dry basis) to 6 parts of said concentrated molasses residue (solids basis).

2. The adhesive material of claim 1, wherein part of said concentrated molasses residue is replaced by concentrated sulphite liquor.

3. An adhesive material adapted to be applied as the bonding material for bonding a covering structure of the character herein described to the surface of floors, walls or the like, said adhesive material consisting substantially entirely of a mixture of plastic or semi-plastic clayey filler material and an organic binder containing a substantial proportion of concentrated molasses residue resulting from distillation of fermented molasses and sufficient water to render said mixture spreadable, said clayey material and said binder being employed in proportions of about 5 to 8 parts of said clayey material (dry basis) to 6 parts of said binder (solids basis).

4. A preformed ready-to-lay covering structure comprising in combination a normally non-sticky cementitious material applied to one side thereof and adapted to be activated with water to impart thereto adhesiveness when the covering structure is to be installed, said cementitious material consisting substantially entirely of plastic or semi-plastic clayey material and a binder material selected from the group of binder materials consisting of concentrated molasses residue resulting from distillation of fermented molasses and mixtures of such concentrated molasses residue with concentrated sulphite liquor, said clayey material and said binder material being employed in proportions of about 5 to 8 parts of said clayey material (dry basis) to 6 parts of said binder material (solids basis).

5. A preformed ready-to-lay covering structure comprising in combination a normally non-sticky cementitious material applied to one side thereof and adapted to be activated with water to impart thereto adhesiveness when the covering structure is to be installed, said cementitious material consisting substantially entirely of a mixture of plastic or semi-plastic clayey filler material and an organic binder containing a substantial proportion of concentrated molasses residue resulting from distillation of fermented molasses, said plastic or semi-plastic clayey material and said binder being employed in proportions of about 5 to 8 parts of said clayey material (dry basis) to 6 parts of said binder (solids basis).

WILLIAM B. COLEMAN.